W. Zeller.
Mower.
No 23638 Patented Apr. 12, 1859.
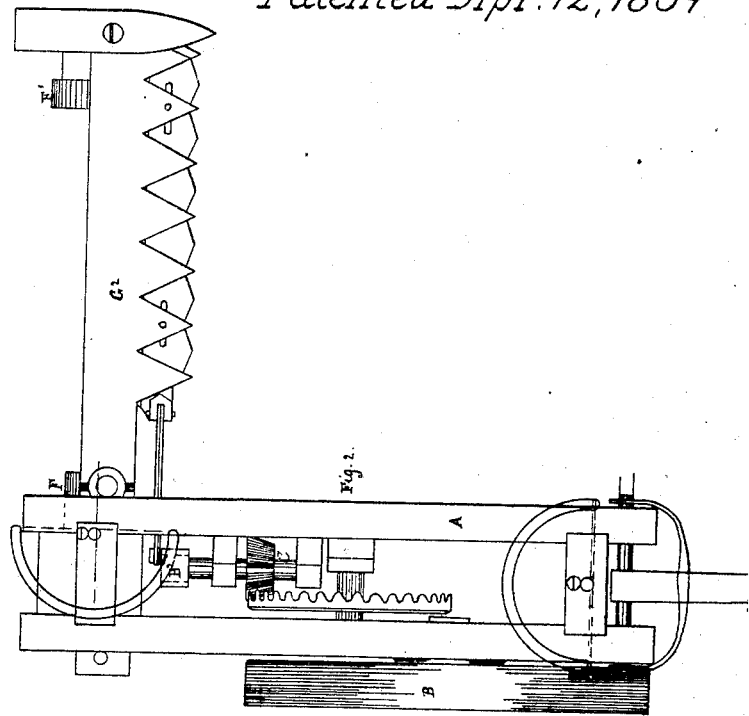
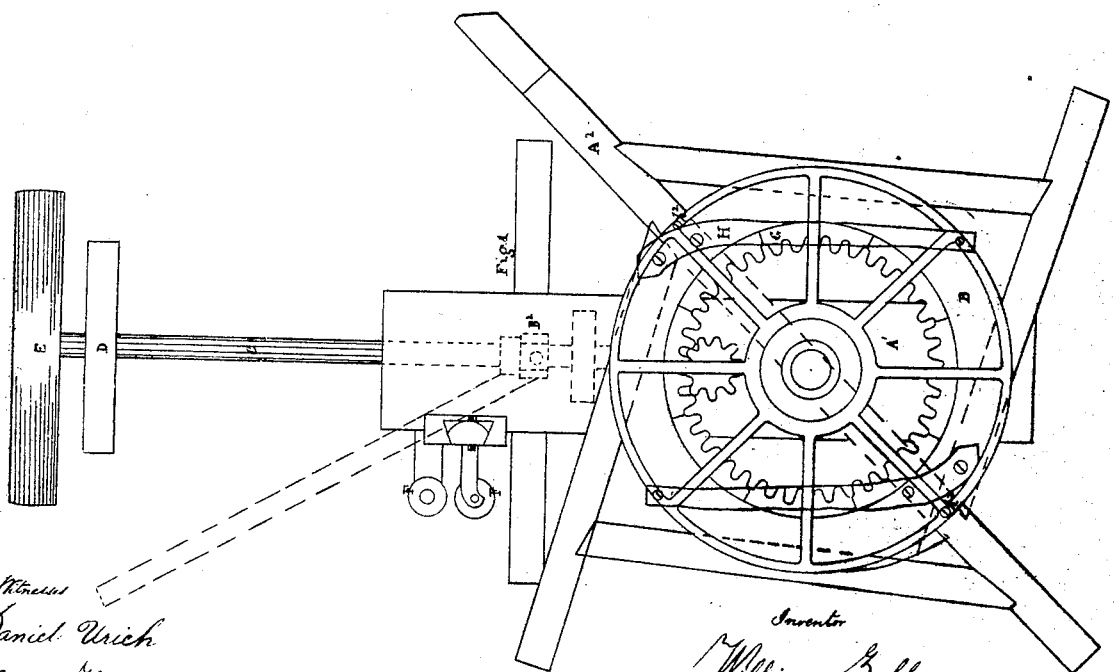
Witnesses
Daniel Urich
Alex Helm
Inventor
William Zeller

UNITED STATES PATENT OFFICE.

WILLIAM ZELLER, OF MILL CREEK, PENNSYLVANIA.

IMPROVED MODE OF APPLYING AND CONSTRUCTING HORSE-POWER MACHINES.

Specification forming part of Letters Patent No. 23,638, dated April 12, 1859.

*To all whom it may concern:*

Be it known that I, WILLIAM ZELLER, of Mill Creek township, in the county of Lebanon and State of Pennsylvania, have invented a new and Improved Mode of Applying and Constructing Horse-Powers; and I hereby declare that the following is a full and exact description thereof, reference being had to the accompanying drawings, and to the letters of reference marked thereon.

The nature of my invention consists in combining the operation of the common horse-power with a reaper or mower, and readily applying the same power to other purposes of sawing or thrashing, &c.

To enable others skilled in the art to make and use my invention, I will proceed to describe its construction and operation.

Figure 1 shows a plan of a machine as a horse-power; and Fig. 2, a plan of the same with arms $A^2$ taken off, and the same power used for a reaper or mower.

The wheel B and the trucks F F' serve as trucks to carriage when used for a reaper, but when used for a horse-power $G^2$ is detached and the frame turned down. The shaft C is attached to shaft C' at $B^2$ $B^2$ by any of the well-known drivers for couplings. The arms A are attached to the outer rim of the driving-wheel by the screw-bolts $h^2$ $k^2$. The stays H are also made fast to the arms and on the rim of the driving-wheel by screws.

D, Fig. 1, is a sill or rest for the shaft C, and E the band-wheel. The peculiar advantages of this combination are that when the horse-power is used for any other purpose than a reaper the wear on the cogs of the machinery is reversed, which will give nearly double wear to the machine, besides saving to the farmer the expense of one whole horse-power and machine, and a large saving of power in the manner of attaching the lever $A^2$.

G, Fig. 1, represents the cogged segments, which are made adjustable to the rim of the wheel B and secured by bolts or screws.

Having thus fully described my invention, I do not claim the cog-wheels or gearing used; but

What I claim is—

The construction of the horse-power machine herein described, as shown in Figs. 1 and 2, by which it is made to drive a reaping-machine or stationary power, when the whole is constructed, arranged, and operated substantially as and for the purposes described.

WILLIAM ZELLER.

Witnesses:
 DANIEL URICH,
 ALEX. HELMS.